No. 785,451. PATENTED MAR. 21, 1905.
C. B. TOURVILLE.
LIVE FISH BOX.
APPLICATION FILED OCT. 3, 1904.

Witness
Inventor
Charles B. Tourville
Attorney

No. 785,451. Patented March 21, 1905.

UNITED STATES PATENT OFFICE.

CHARLES B. TOURVILLE, OF ST. LOUIS, MISSOURI, ASSIGNOR OF ONE-HALF TO KATIE KUHLMANN, OF ST. LOUIS, MISSOURI.

LIVE-FISH BOX.

SPECIFICATION forming part of Letters Patent No. 785,451, dated March 21, 1905.

Application filed October 3, 1904. Serial No. 227,024.

*To all whom it may concern:*

Be it known that I, CHARLES B. TOURVILLE, a citizen of the United States, residing at St. Louis, State of Missouri, have invented certain new and useful Improvements in Live-Fish Boxes, of which the following is a full, clear, and exact description, reference being had to the accompanying drawings, forming a part hereof.

My invention has relation to improvements in live-fish boxes; and it consists in the novel construction of box more fully set forth in the specification and pointed out in the claim.

Figure 1:
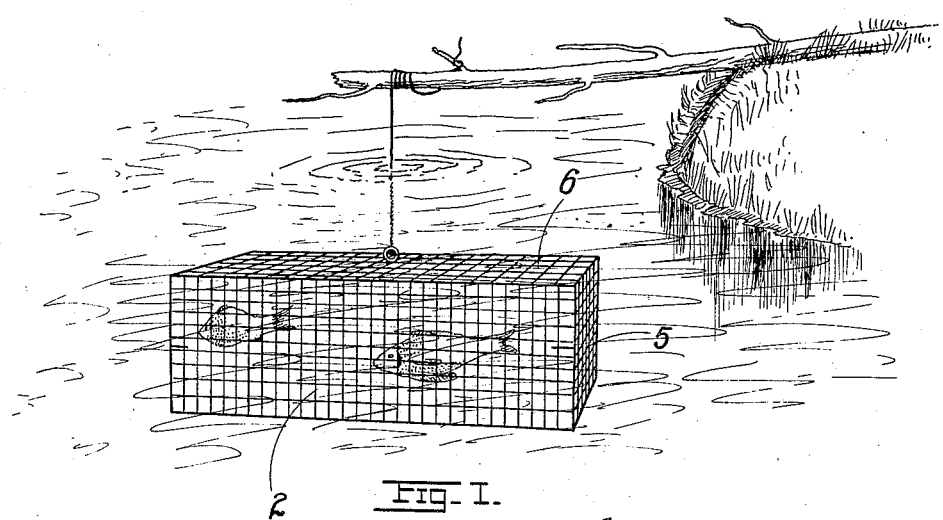
Figure 2:
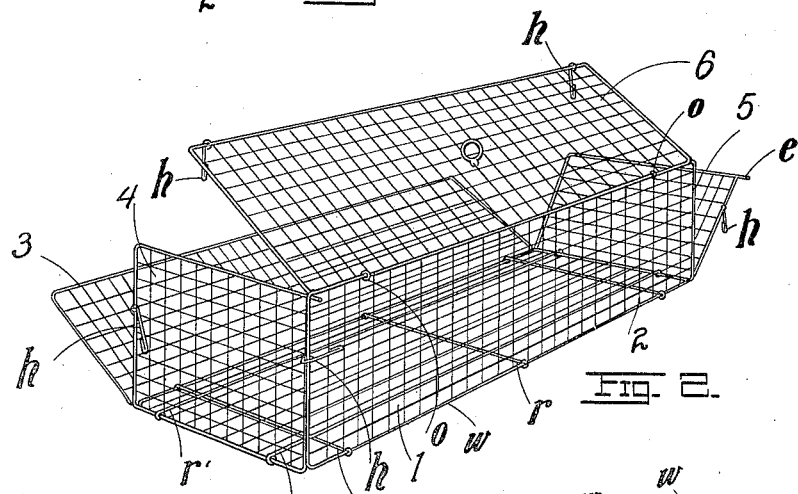
Figures 3, 4, 5:
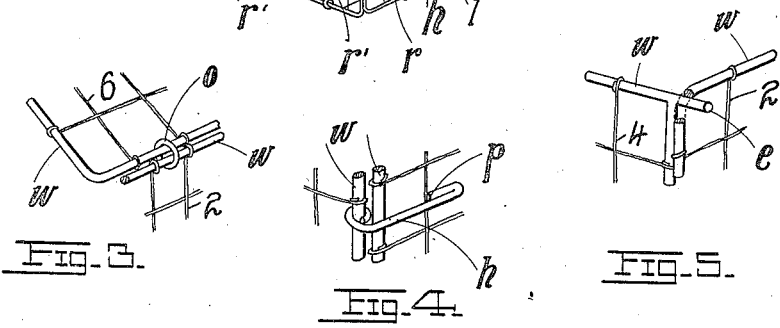

In the drawings, Figure 1 is a perspective of my box unfolded and showing the same in actual use. Fig. 2 is a perspective of the box partially unfolded. Fig. 3 is a perspective detail showing manner of hinging the lid. Fig. 4 is a perspective detail showing the locking-hook for securing two adjacent foldable sections, and Fig. 5 is a perspective detail showing manner of insuring rigidity between the end sections and rear wall.

The object of my invention is to construct a folding or collapsible box for placing the fish in after they are caught with a view of keeping the same alive as long as possible. It has been customary to provide a net for the fish after they are caught; but a net when submerged in the water collapses and the fish become entangled therein and eventually they die.

My box may be submerged, and, being constructed wholly of wire, it preserves its shape and the fish are free to swim about unhampered and can eventually be brought home alive and fresh.

In detail the invention may be described as follows:

Referring to the drawings, 1 2 3 4 5 6 respectively represent the bottom, back, front, two end walls, and lid of a folding box, the several walls or sections being constructed of wire. The base of the marginal wire $w$ of the front and rear walls passes through the looped ends of the transverse rods $r$ of the bottom, and the base of the marginal wire of the end walls 4 5 passes through the terminal loops of corresponding rods $r'$ of the bottom, the several walls or sections when folded being held in proper relation by hooks $h$, one end of the hook being looped about the marginal wire of one section and having a terminal bent portion $p$, which engages the wire of the adjacent or contiguous section, Fig. 4. The mere frictional engagement between the inturned ends $p$ of the hooks and the wire of the contiguous sections is sufficient to retain the latter in position. The rear end of the upper portion of the marginal wire of the end section is provided with an extension $e$, which passes inside the marginal wire of the section 2, the end sections being thus reinforced against strain from the inside. The lid 6 is hinged, by means of rings $o$, to the marginal wire of section 2. The sections when properly unfolded and secured form a complete wire cage or box, which can be suspended in the water, as seen in Fig. 1, and the fish introduced thereinto as they are caught.

I may of course depart from the details here shown without in any wise affecting the nature or spirit of my invention.

Having described my invention, what I claim is—

A live-fish box composed of wire, and comprising a bottom having longitudinally and transversely disposed rods terminating in loops, end, front and rear walls having marginal wires passing through the loops of the respective rods, a lid hinged to the rear wall, and locking-hooks looped about the marginal wire of one wall and having bent terminals for engaging the wire of the contiguous wall, the rear ends of the upper portions of the end walls being extended rearwardly and passing under the marginal wire of the rear wall in the assembled position of the several walls, substantially as set forth.

In testimony whereof I affix my signature in presence of two witnesses.

CHARLES B. TOURVILLE.

Witnesses:
EMIL STAREK,
G. L. BELFRY.